US005946088A

United States Patent [19]

Aldridge

[11] Patent Number: 5,946,088

[45] Date of Patent: Aug. 31, 1999

[54] APPARATUS FOR MIXING AND DETECTING ON-LINE HOMOGENEITY

[75] Inventor: Paul K. Aldridge, Groton, Conn.

[73] Assignee: Pfizer Inc., New York, N.Y.

[21] Appl. No.: 08/237,567

[22] Filed: May 3, 1994

[51] Int. Cl.[6] .......... G01J 3/00

[52] U.S. Cl. .......... 356/300

[58] Field of Search .......... 356/300, 39

[56] References Cited

U.S. PATENT DOCUMENTS

| | | | |
|---|---|---|---|
| 2,514,126 | 7/1950 | Fischer . | |
| 4,125,327 | 11/1978 | Margolis | 356/39 |
| 4,571,089 | 2/1986 | Gudlauski et al. . | |

FOREIGN PATENT DOCUMENTS

| | | |
|---|---|---|
| 56379 | 3/1980 | Austria . |
| 57257 | 4/1980 | Austria . |
| 1905290 | 10/1920 | Germany . |
| 3337403 | 5/1985 | Germany . |
| 54-127065 | 2/1979 | Japan . |
| 61-230727 | 10/1986 | Japan . |
| 05016134 | 1/1993 | Japan . |
| 1402856 | 6/1988 | Russian Federation . |
| 89005879 | 2/1989 | Russian Federation . |
| 590441 | 7/1947 | United Kingdom . |
| 1386312 | 3/1975 | United Kingdom . |
| 2252259 | 8/1992 | United Kingdom . |

OTHER PUBLICATIONS

Chemical Abstracts, CA Plus 115: 84568 (1991).

Applied Spectroscopy, 41 (5), pp. 786–790 (1987).

Applied Spectroscopy, 46 (6), pp. 1020–1024 (1992).

J. Pharm. & Biomed. Analysis, 11, pp. 1077–1085 (1993).

J. of Soc. of Powder Tech., Japan; 22 (2), pp. 79–84 (1985).

J. of Soc. of Powder Tech., Japan; 25 (3), pp. 139–145 (1988).

J.I.S. Usage Series Manual, Chapter 6.12, pp. 316–317 (1990).

M. Poux et al., Powder Technology, 68, (1991), 213–234.

F. S. Lai et al., Powder Technology, 10, (1974), 13–21.

J. A. Hersey, Powder Technology, 15, (1976), 149–153.

J. Bridgwater, Powder Technology, 15, (1976), 215–236.

L. T. Fan et al., Powder Technology, 11, (1975), 27–32.

C. W. Yip et al., Drug Development and Industrial Pharmacy, 3(5), 429–438, (1977).

W. J. Thiel et al., Powder Technology, 31, (1982), 45–50.

R. H. Wang et al., Chemical Engineering, May 27, 1974, 88–94.

M. Satoh et al., J. Soc., Powder Technology, Jpn., 24, (1987) 647.

C. J. Broadbent et al., Powder Technology, 76, (1993), 317–329.

M. Alonso et al., Powder Technology, 56, (1988), 135–141.

L. T. Fan et al., Powder Technology, 61, (1990), 255–287.

Emil W. Ciurczak, Pharm. Tech., Sep. 1991, 140–145.

J. A. Hersey, Powder Technology, 11, (1975), 41–44.

J. Haleblian et al., J. Pharm. Sciences, 58(8), (1969), 911–929.

*Primary Examiner*—K P Hantis

*Attorney, Agent, or Firm*—Peter C. Richardson; Gregg C. Benson; Carl J. Goddard

[57] ABSTRACT

This invention relates to an apparatus for mixing compositions of matter into a homogeneous mixture and detecting on-line the homogeneity and potency of the mixture, and a method for using the same. More particularly, this invention relates to an apparatus for mixing the components of a pharmaceutical composition into a homogeneous mixture and detecting on-line the homogeneity and potency of said pharmaceutical composition.

18 Claims, 4 Drawing Sheets

140
501
502
503

400
125
405
410
415
420

501
140
502
503

501
140
502
503

143
147
502
503

140
141
128
210
101
107
125
141
140
104

501
6a
502
6a
500

APPARATUS FOR MIXING AND DETECTING ON-LINE HOMOGENEITY

TECHNICAL FIELD

This invention relates to an apparatus for mixing compositions of matter into a homogeneous mixture and detecting on-line the homogeneity and potency of the mixture, and a method for using the same. More particularly, this invention relates to an apparatus for mixing the components of a pharmaceutical composition into a homogeneous mixture and detecting on-line the homogeneity and potency of said pharmaceutical composition.

BACKGROUND OF THE INVENTION

The mixing of pharmaceutical compositions is a crucial step in processing an active drug into a form for administration to a recipient. Pharmaceutical compositions usually consist of five (5) or more separate components, including the active drug, which must be mixed into a homogeneous mixture. It is critical to determine the concentration of the active drug in a pharmaceutical mixture. It is also advantageous to determine the concentration of the other non-active components within the final homogeneous mixture. The assurance that the pharmaceutical composition is homogeneous is necessary in order to ensure the appropriate dosage of the active drug is delivered to a recipient.

The concentration of the non-active components in a pharmaceutical mixture is also important because it determines the physical properties of the mixture. For example, the non-active components of pharmaceutical compositions are known as excipients. An example of an excipient is a disintegrant. Disintegrants determine the rate of dissolution of a tablet in a recipient's stomach. Therefore, if the disintegrant is not homogeneously distributed in the pharmaceutical mixture, then the resulting tablets may not dissolve at a uniform rate. This could give rise to quality, dosing and bioavailability problems.

Typically, homogeneity of a pharmaceutical composition referred to the distribution of the active drug in the pharmaceutical composition. Potency of a pharmaceutical composition referred to the amount of the active component in a pharmaceutical composition. Traditionally, the determination of the potency and homogeneity of a pharmaceutical mixture has been time consuming. In addition, traditional methods measure the potency and homogeneity of only the active component in a pharmaceutical composition and gives no information concerning the homogeneity of the non-active components.

The traditional methods typically involve using a conventional blender such as a core blender, a ribbon blender, a "V"-blender or the like, to mix the components of a pharmaceutical composition. When the mixture is thought to be finished, the blender is stopped and usually nine or more samples of the mixture are removed from various locations in the conventional blender. The blender remains shut down while the samples are taken to a laboratory and analyzed for potency. The samples are typically analyzed using High Performance Liquid Chromatography (HPLC). The HPLC analysis determines the concentration of only the active component in each of the samples. The measurements determine whether the active component is uniformly dispersed or homogeneous in the mixture and present at an appropriate concentration level. This information reflects the potency of the mixture and if the potency of each of the samples is the same, then the mixture is considered to be homogeneous. HPLC analysis does not establish the concentration of the non-active components of the mixture. Homogeneity of all the components of a pharmaceutical mixture is important because the dispersion of certain components will ultimately affect the physical properties of the final form of the pharmaceutical composition, as discussed hereinabove. The traditional analysis can take from 24 to 48 hours to complete.

Another time consuming aspect of the traditional method is the hit or miss approach to determine when the mixture is homogeneous. Typically, the blender is run for a predetermined amount of time. The blender is stopped and the samples are taken to be tested. If the mixture is not homogeneous then the blender is run again and the testing procedure is repeated. Further, the mixture may reach homogeneity at a time-point before the predetermined set time for blending. In the first case more testing is carried out than is required, and in the second case valuable time is wasted in blending beyond the end-point. It is also possible that over blending can cause segregation of the components. Therefore, the time that is wasted in both cases and the possible risk of segregation due to over blending can be avoided by an apparatus which could detect on-line the potency and homogeneity of the pharmaceutical mixture. The term on-line means that the blender does not have to be turned off in order to take the measurements to determine homogeneity and potency.

For the foregoing reasons, there has been a long felt need in the art for an apparatus which can blend the components of a pharmaceutical mixture and detect on-line the potency and homogeneity of all the components of a pharmaceutical mixture. There is currently no apparatus in the art which can blend a pharmaceutical composition and detect on-line the homogeneity and potency of a pharmaceutical mixture.

SUMMARY OF THE INVENTION

This invention is directed to an apparatus for mixing compositions of matter into a homogeneous mixture and detecting on-line the homogeneity and potency of a mixture during the mixing process. The apparatus comprises a mixing means for mixing compositions of matter. The mixing means has a container for holding the compositions of matter to be mixed, preferably, said container rotates about an axis of rotation during the mixing process. The container has an aperture covered and sealed by a pellucid sealing means. In close proximity to, preferably abutting, the pellucid sealing means is a detection means for detecting the on-line spectroscopic characteristics of the mixture of compositions of matter.

In a preferred embodiment of this invention, said aperture is sealed by an arbor (a hollow shaft). A detection means for detecting the on-line spectroscopic characteristics of the mixture of compositions of matter is rotatably mounted through said arbor. A means for detecting the rotational position of said container is attached to the mixing means. The means for detecting rotational position relays to a data acquisition and control computer the rotational or angular position of said container. The data acquisition and control computer synchronizes the taking of spectroscopic data, by the detection means with a predetermined single rotational position or multiple rotational positions of said container of the mixing means. The taking of spectral data at a consistent predetermined point in the rotation of the container assures a greater degree of accuracy in determining the homogeneity of the mixture being mixed.

Another aspect of this invention is directed to a method for mixing compositions of matter into a homogeneous mixture and simultaneously detecting on-line the homogeneity and potency of the mixture of compositions of matter. The method comprises the steps of charging the mixing means with the individual compositions of matter to be mixed; mixing the compositions of matter; simultaneously detecting on-line the spectroscopic characteristic of the mixture with a detection means; optionally, synchronizing the detecting on-line of the spectroscopic characteristic of the mixture by a detection means with a predetermined single or multiple rotational position of a container which rotates about an axis of rotation, of a mixing means; and either manually shutting off the apparatus of this invention or automatically shutting off the apparatus of this invention utilizing a data acquisition and control computer when the spectroscopic characteristics of said mixture reach a predetermined homogeneity and potency end point as compared to a spectra of a known homogeneous mixture or until the variance in the spectroscopic characteristic converge.

This invention, therefore, allows spectra of a mixture to be collected while the mixing means is in motion, thereby, avoiding the down-time and over-shooting or under-shooting the end point which is characteristic of the traditional process for mixing and determining the potency of a mixture.

Other features and advantages of this invention will be apparent from the specification and claims and from the accompanying drawings which illustrate certain embodiments of this invention.

DETAILED DESCRIPTION OF THE INVENTION

Different types of blenders are currently used in the art for mixing pharmaceutical compositions. One type of blender is exemplified by the "V"-blender which mixes compositions of matter, such as powders or liquids by rotating the container which holds the compositions of matter about an axis of rotation. Therefore, one of the embodiments of this invention is a modified "V"-blender, which is illustrated in FIG. 1.

Figure 1:
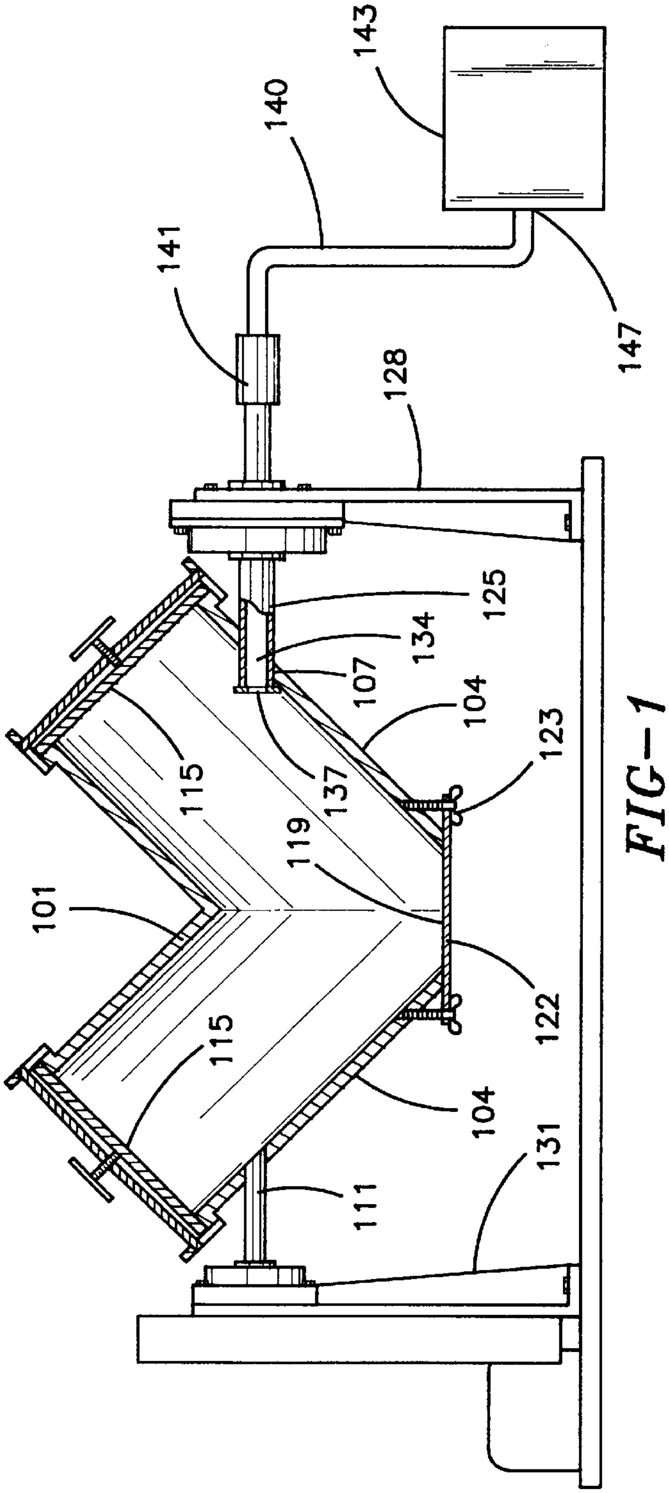
FIG. 1 illustrates a side view of an exemplary apparatus of this invention, with a cross sectional view of the container 101 and first axle 125.
Figure 2:
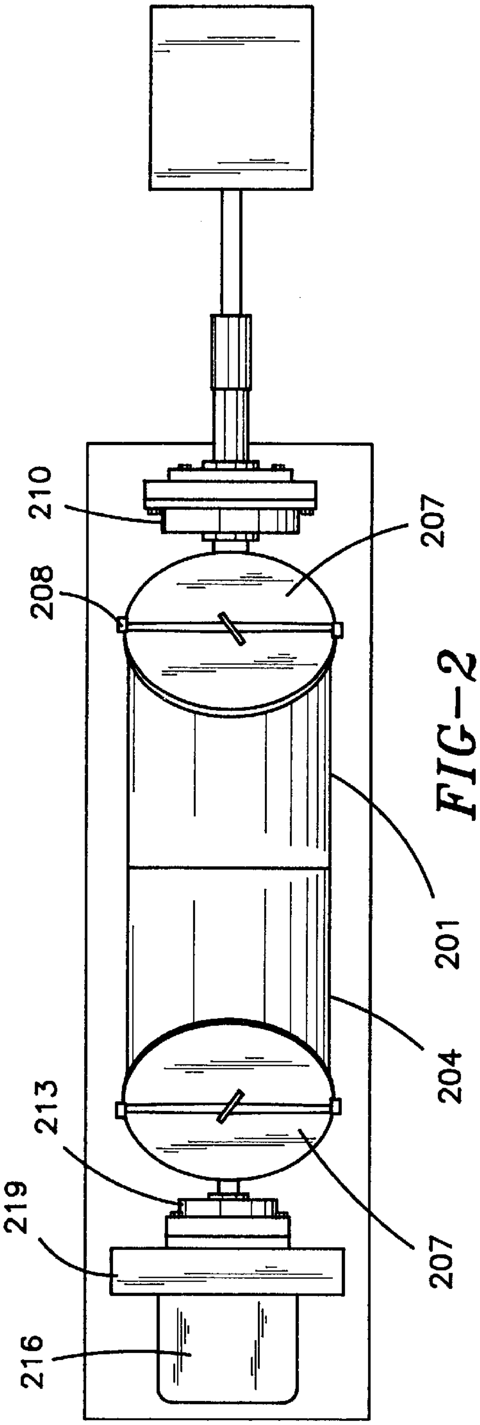
FIG. 2 illustrates a top view of the apparatus depicted in FIG. 1.

According to FIG. 1 and FIG. 2 container 101 holds the compositions of matter to be mixed. Container 101 has a general "V" shape which is formed from a first hollow leg 201 open to a second hollow leg 204 which converge with each other at an angle, thereby giving it the "V" shape. Container 101 has an outward facing surface wall 104, which is the outside surface of the longer portion of legs 201 and 204 of container 101. Aperture 107 is disposed through outward facing surface wall 104. The aperture position is fixed by the position of second axle 111 and said second axle's connection with second hollow leg 204, which is described hereinbelow.

Openings 115 at the top of container 101 are used for either charging container 101 with the individual compositions of matter which are to be mixed or discharging the finished homogeneous mixture. Openings 115 are covered and sealed during the mixing process by top covers 207. Top covers 207 are secured to container 101 by top clasps 208. Opening 119 at the bottom of container 101 is used for either charging container 101 with the individual compositions of matter which are to be mixed or discharging the finished homogeneous mixture. Opening 119 is covered and sealed during the mixing process by bottom cover 122. Bottom cover 122 is secured to container 101 by bottom clasps 123.

First ballbearing pillow block 210 has a lateral hole through it, preferably at its center. Ballbearing pillow blocks are well known in the art; they have bearings in them which allow for free rotation of an axle which is disposed in the hole and they also function as supports. These features of the ballbearing pillow block are more fully explained below. First support 128 has a lateral hole through it, disposed at its top end. First ballbearing pillow block 210 is disposed between container 101 and first support 128 and is attached, usually by bolts, to the side of first support 128 so that the hole of first ballbearing pillow block 210 and the hole of first support 128 are aligned.

Second ballbearing pillow block 213 has a lateral hole through it, preferably at its center. Second support 131 has a lateral hole through it disposed at its top end. Second ballbearing pillow block 213 is disposed between container 101 and second support 131 and is attached, usually by bolts, to the side of second support 131 so that the hole of second ballbearing pillow block 213 and the hole of second support 131 are aligned.

Second axle 111 has a first end and a second end, it is attached by its first end to container 101. The second end of second axle 111 is rotatably mounted through the aligned lateral holes of second ballbearing pillow block 213 and second support 131 and connected to a means for rotation 216, such as a motor. The motor can be connected directly to second axle 111 or it can be connected by a drive mechanism 219, such as a chain or a belt. Motor 216 rotates container 101 thereby mixing the individual compositions of matter into a homogeneous mixture.

Figures 3, 4, 5, 6A, 6B, 6C, 6D:
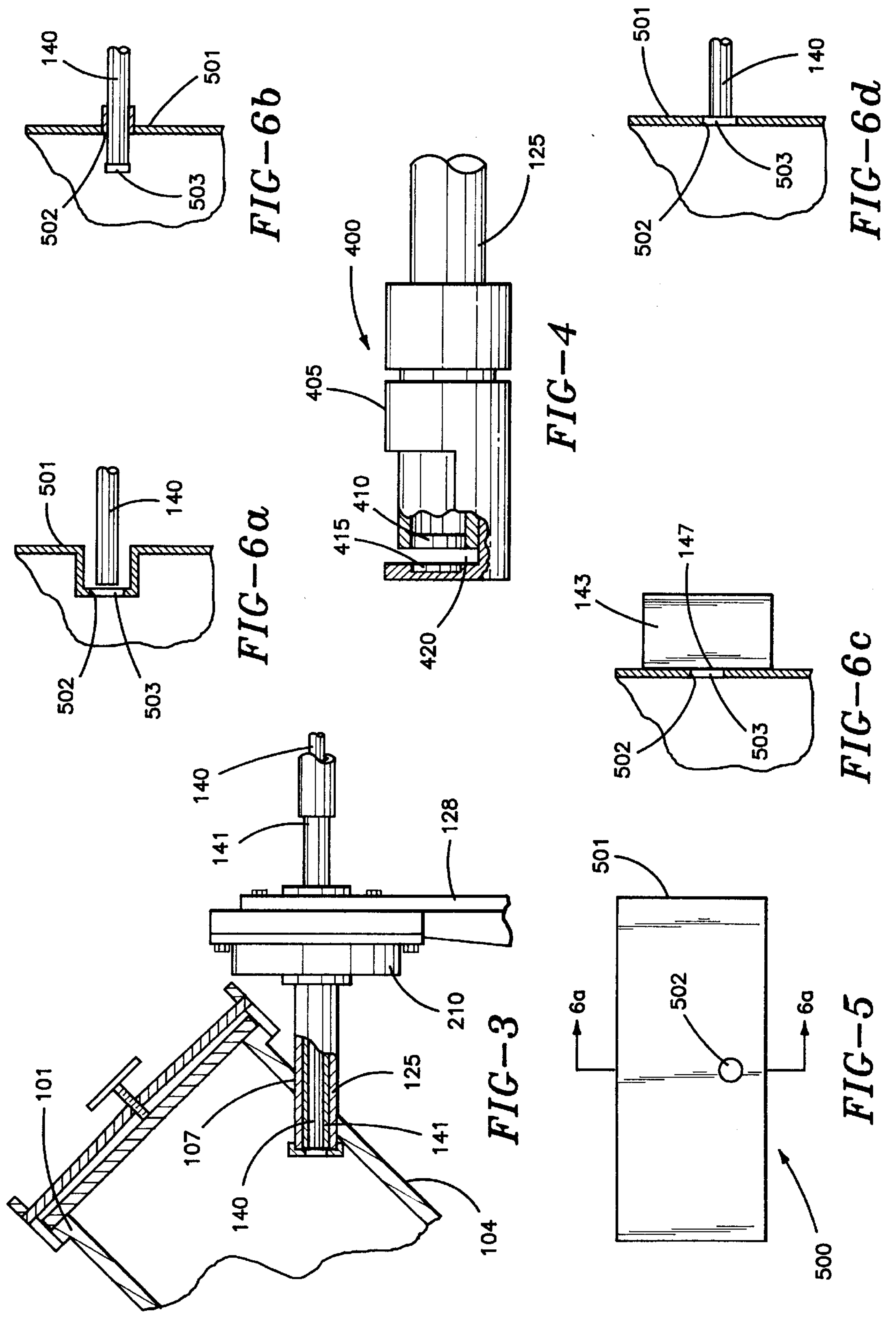
FIG. 3 illustrates an enlarged view of FIG. 1, broken away to illustrate a portion of the container and its attachment to the spectroscopic means.
FIG. 4 illustrates a side view of a transflectance probe attached to an axle.
FIG. 5 illustrates a representational side view of a conventional blender which has internal mixing means (e.g., ribbon blender or a core blender).
FIGS. 6*a* to 6*d* are cross sectional views taken along line 5*a* showing the blender aperture and illustrate different means of connecting the detection means to the blender apparatus.

According to FIG. 3, first axle 125 has a first end and a second end. First axle 125 is attached by its first end through aperture 107 to container 101 in such a manner so that a portion of the first end of first axle 125 protrudes into container 101. A portion of the first end of first axle 125 has to protrude into container 101 enough so that the compositions of matter which are being mixed come into contact with the portion of the first end of first axle 125 during the mixing process. The second end of first axle 125 is rotatably mounted through the aligned lateral holes of first ballbearing pillow block 210 and first support 128 so that first axle 125 is aligned with second axle 111 to form a level and horizontal axis of rotation. The horizontal axis of rotation must be high enough up the legs of container 101 so that container

101 can freely rotate 360° about the axis of rotation formed by said first and second axles.

As shown in FIG. 1, first axle 125 has a bore 134 therethrough. Bore 134 is covered at the first end of first axle 125 by a pellucid sealing means 137, such as a pellucid window or a transflectance probe. Said pellucid window can be made from glass, quartz or sapphire, depending upon the wavelength region of the radiation issuing from the spectroscopic means which is discussed hereinbelow. In the present embodiment a pellucid window is preferred as the pellucid sealing means and quartz is the preferred material for pellucid window 137.

Alternatively, bore 134 is covered at the first end of first axle 125 by transflectance probe 400, shown in FIG. 4. According to FIG. 4 transflectance probe 400 is comprised of housing 405, pellucid lens 410, reflector 415 and has a void 420. Examples of conduction means for conducting radiation 140, are light pipes, optics and a fiber optic bundle. The fiber optic bundle is the preferred conduction means for this embodiment. According to FIGS. 1 and 3, fiber optic bundle 140 has a first end and a second end. The first end of the fiber optic bundle 140 runs through and is covered by sleeve 141. Sleeve 141 housing fiber optic bundle 140 is removably disposed inside bore 134 so that the first end of fiber optic bundle 140 is in close proximity to pellucid window 137 so that the radiation emanating from said fiber optic bundle passes through pellucid window 137 at an essentially horizontal level and without distortion from outside sources of interference which may disrupt the source radiation. Preferably said fiber optic bundle abuts said pellucid window. The second end of fiber optic bundle 140 is removably attached to spectroscopic means 143 through opening 147 in spectroscopic means 143. Opening 147 is where the radiation from spectroscopic means 143 emanates and the diffusely reflected radiation or reflected radiation from the mixture via fiber optic bundle 140 is admitted. The following are examples of preferred spectroscopic means: infrared spectrophotometer; ultraviolet-visible spectrophotometer; near infrared spectrophotometer; mid-range infrared spectrophotometer and raman spectrophotometer.

Fiber optic bundle 140 contains two sets of optical fibers. The first set of optical fibers convey radiation emanating from spectroscopic means 143 to the mixture inside container 101. Pellucid window 137 allows the radiation emanating from fiber optic bundle 140 to pass through to the mixture without distortion.

If the mixture is a solid then the radiation signal is analyzed by reflectance. The radiation hitting the solid mixture is diffusely reflected. The second set of optical fibers collect the diffusely reflected radiation from the mixture and convey it back to spectroscopic means 143.

If the mixture is a liquid then the radiation is analyzed by transflectance. For a liquid mixture transflectance probe 400 is fitted onto the first end of axle 125 in place of pellucid window 137. The radiation emitting from the first set of fibers of fiber optic bundle 140 passes through pellucid lens 410 and through the liquid mixture that is in void 420 between reflector 415 and housing 405. Pellucid lens 410 is made out of the same types of material as enumerated for pellucid window 137 and serves the same function as pellucid window 137. The liquid mixture distorts the radiation, the distorted radiation is then reflected back by reflector 415 to fiber optic bundle 140, where the second set of optical fibers collect the reflected radiation and convey it to spectroscopic means 143.

Spectroscopic means 143 stores and analyzes the diffusely reflected or reflected radiation; or spectroscopic means 143 can further transmit the spectral data to a computer which then analyzes it.

The particularly preferred spectroscopic means is the NIRSystems model 6500 spectrophotometer (a near infrared spectrophotometer), available from NIRSystems Inc., 12101 Tech Road, Silver Spring, Md., 20904. The computer which analyzes the data can be any personal computer such as the Zeos 33 MHz 80846DX PC with 8 Mb of RAM. The data is collected in the computer using Near infrared Spectral Analysis Software (NSAS), which is the instrument control package provided with the spectroscopic instrument from NIRSystems. The data is then analyzed in Matlab (software package) available from The Mathworks Inc. (The Mathworks Inc., Cochituate Place, 24 Prime Park Way, Natick, Mass., 01760).

FIG. 5 is a generic representation of another type of conventional blender used for mixing compositions of matter. This other type of conventional blender does not require the blender's container to be rotated about an axis of rotation to mix the individual compositions of matter into a homogeneous mixture. Instead, this other type of conventional blender relies upon agitators inside the container, such as blades or stirrers, to mix the compositions of matter into a homogeneous mixture. A ribbon blender is an example of a conventional blender which utilizes blades. A core blender is an example of a conventional blender which utilizes stirrers. In addition to mixing powders and liquids these blenders can also mix compositions of matter for salves and creams.

According to FIG. 5, the rectangular box designated by 500 represents any stationary conventional blender which relies upon internal agitators to mix compositions of matter into a homogeneous mixture. Blender 500 has an aperture 502 in one of the blender's walls 501. However, more than one aperture can be present in any one or more of the blender's walls. The aperture must open into the inside of the container portion of blender 500 so that the detection means will be able to convey the radiation from the spectroscopic means to the mixture inside the container of the blender and the reflected or transflected radiation can be collected and analyzed.

FIG. 6*a* illustrates an embodiment of aperture 502, blender wall 501 and conduction means 140 wherein blender wall 501 is dimpled inward into the container of blender 500. Aperture 502 in blender wall 501 is covered and sealed by pellucid barrier 503. Pellucid barrier 503 is made out of the same types of material as enumerated for pellucid window 137 and serves the same function as pellucid window 137. The first end of conduction means 140 is in close proximity to, preferably abutting, pellucid barrier 503 and the second end of means for conducting radiation 140 is removably attached to spectroscopic means 143 as illustrated in FIG. 1 and discussed hereinabove.

FIG. 6*b* illustrates another embodiment of aperture 502, blender wall 501 and conduction means 140. Aperture 502 is covered and sealed by attaching conduction means 140 to blender wall 501 through aperture 502. Conduction means 140 protrudes into the container of blender 500. The end of conduction means 140 protruding inside the container is covered by pellucid barrier 503. Alternatively, transflectance probe 400, discussed hereinabove, can be interchanged for pellucid barrier 503.

FIG. 6*c* illustrates an embodiment of aperture 502, blender wall 501 and spectroscopic means 143. In this embodiment pellucid barrier 503 covers and seals aperture 502 in blender wall 501. Spectroscopic means 143 is placed next to blender wall 501 so that opening 147 in spectroscopic means 143, from which the radiation emanates and is admitted, is in close proximity to, preferably abutting, pellucid barrier 503.

FIG. 6*d* illustrates a further embodiment of aperture 502, blender wall 501 and conduction means 140. In this embodiment pellucid barrier 503 covers and seals aperture 502 in blender wall 501. Conduction means 140 is placed so that its first end is in close proximity to, preferably abutting, pellucid barrier 503.

FIGS. 6*a,* 6*b* and 6*d* show certain preferred embodiments in which a conduction means 140 can be combined with blender 500 in order to employ on-line acquisition of spectral data of the mixture being mixed so that the potency and homogeneity of a pharmaceutical mixture can be determined. The acquisition of spectra is accomplished in the same manner as is discussed hereinabove for the exemplary embodiment represented by the modified V-blender.

In an embodiment wherein said conduction means 140, shown in FIGS. 6*a,* 6*b* and 6*d* is a fiber optic bundle, the fiber optic bundle 140 contains two sets of optical fibers. The first set of optical fibers convey radiation from spectroscopic means 143 to the mixture. Pellucid barrier 503 allows the radiation emanating from the first set of optical fibers of fiber optic bundle 140 to pass through to the mixture of compositions of matter without distortion. The radiation contacting the mixture is diffusely reflected in case of solid mixture or transflected in the case of liquids. The second set of optical fibers collect the radiation that is diffusely reflected or reflected from the mixture and convey it back to the spectroscopic means 143. Spectroscopic means 143 analyzes the radiation or spectroscopic means 143 can further convey the data to a computer which will then analyze it.

FIG. 6*c* illustrates an embodiment of this invention which does not require a conduction means 140, instead a spectroscopic means 143 can be placed directly next to blender 500. The exchange of radiation from spectroscopic means 143 and the diffusely reflected radiation from the mixture passes through opening 147 without the aid of a conduction means 140.

Figure 7:
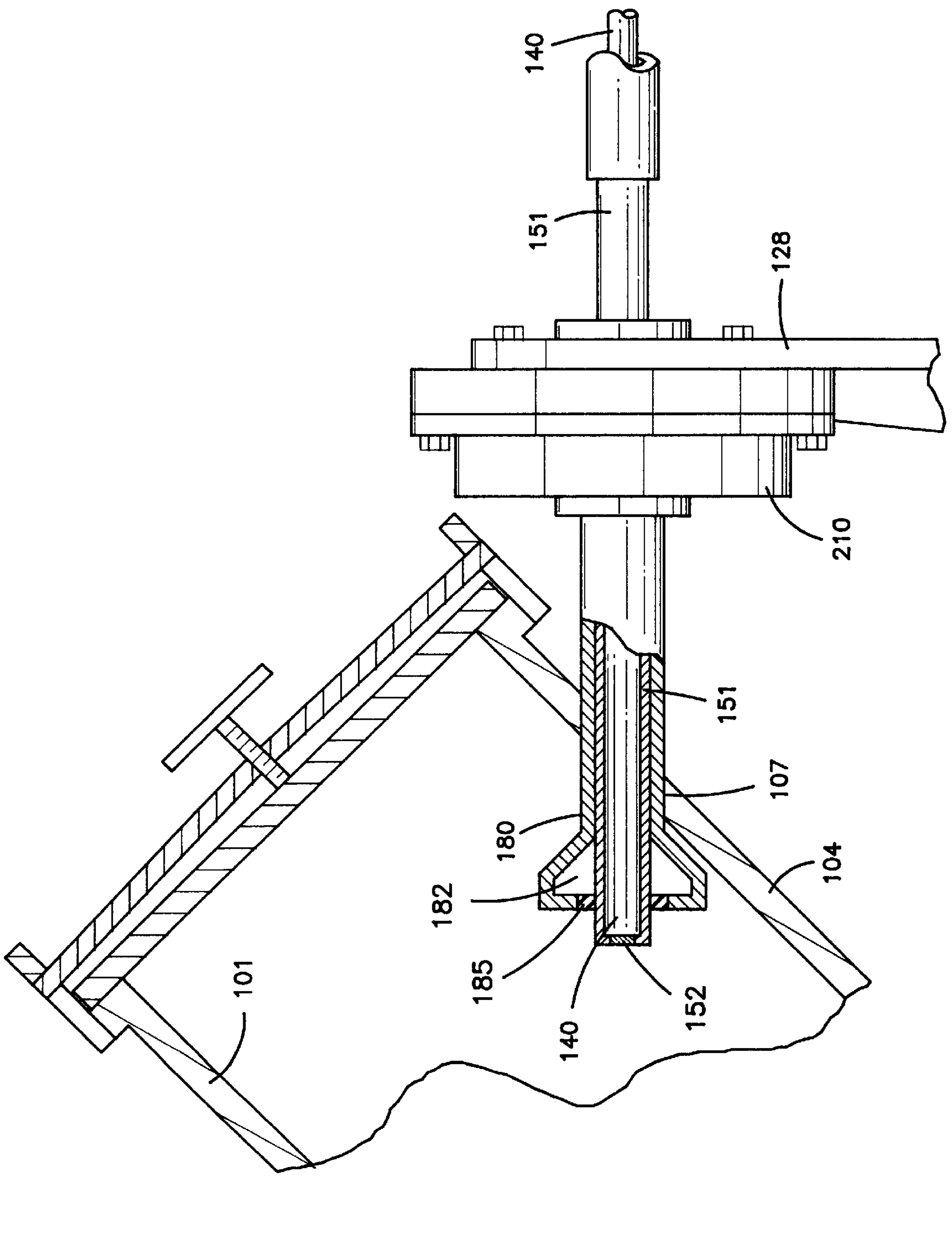
FIG. 7 illustrates an enlarged cross sectional view of an embodiment of the container, arbor and the various inserts within the arbor.

In a preferred embodiment, according to FIG. 7, aperture 107 is occlusively sealed by arbor 180. Arbor 180 has a tunnel 182 therethrough and said arbor has a first end and a second end. Hollow pipe 151 has a first end and a second end; said first end of hollow pipe sealed by an optically transparent sealing means 152, such as a lens or a transflectance probe 400. A lens which is used as an optically transparent sealing means 152 is made of the same materials as enumerated for pellucid sealing means 137. The inside diameter of arbor 180 is larger than the outside diameter of hollow pipe 151 so that said hollow pipe may be removably disposed in said arbor. The first end of arbor 180 extends into container 101 so that it will come into contact with the compositions of matter being mixed in the container. The second end of arbor 180 is rotatably mounted through the aligned lateral holes of first ballbearing pillow block 210 and first support 128 so that arbor 180 is aligned with second axle 111 to form a level and horizontal axis of rotation. The horizontal axis of rotation must be high enough up the legs of container 101 so that container 101 can freely rotate 360° about the axis of rotation formed by arbor 180 and second axle 111. Said fiber optic bundle 140 is disposed inside of hollow pipe 151 with said first end of said fiber optic bundle 140 abutting lens 152 or pellucid lens 410 if the first end of hollow pipe 151 is sealed by transflectance probe 400. Hollow pipe 151 is removably disposed within tunnel 182 of arbor 180 with the first end of hollow pipe 151 preferentially disposed, but not necessarily, beyond the first end of arbor 180. A self-lubricating seal 185 such as TEFLON® (TEFLON® is a registered trademark of E.I. DuPont de Nemours and Co.), is occlusively disposed between the first end of hollow pipe 151 and the first end of arbor 180 in order to prevent leakage of the compositions of matter being mixed in container 101 into tunnel 182 of arbor 180. Seal 185 is self-lubricating and it rotates with arbor 180 and, hence, seal 180 rotates around the first end of hollow pipe 151 and, therefore, hollow pipe 151 remains stationary.

Figure 8:
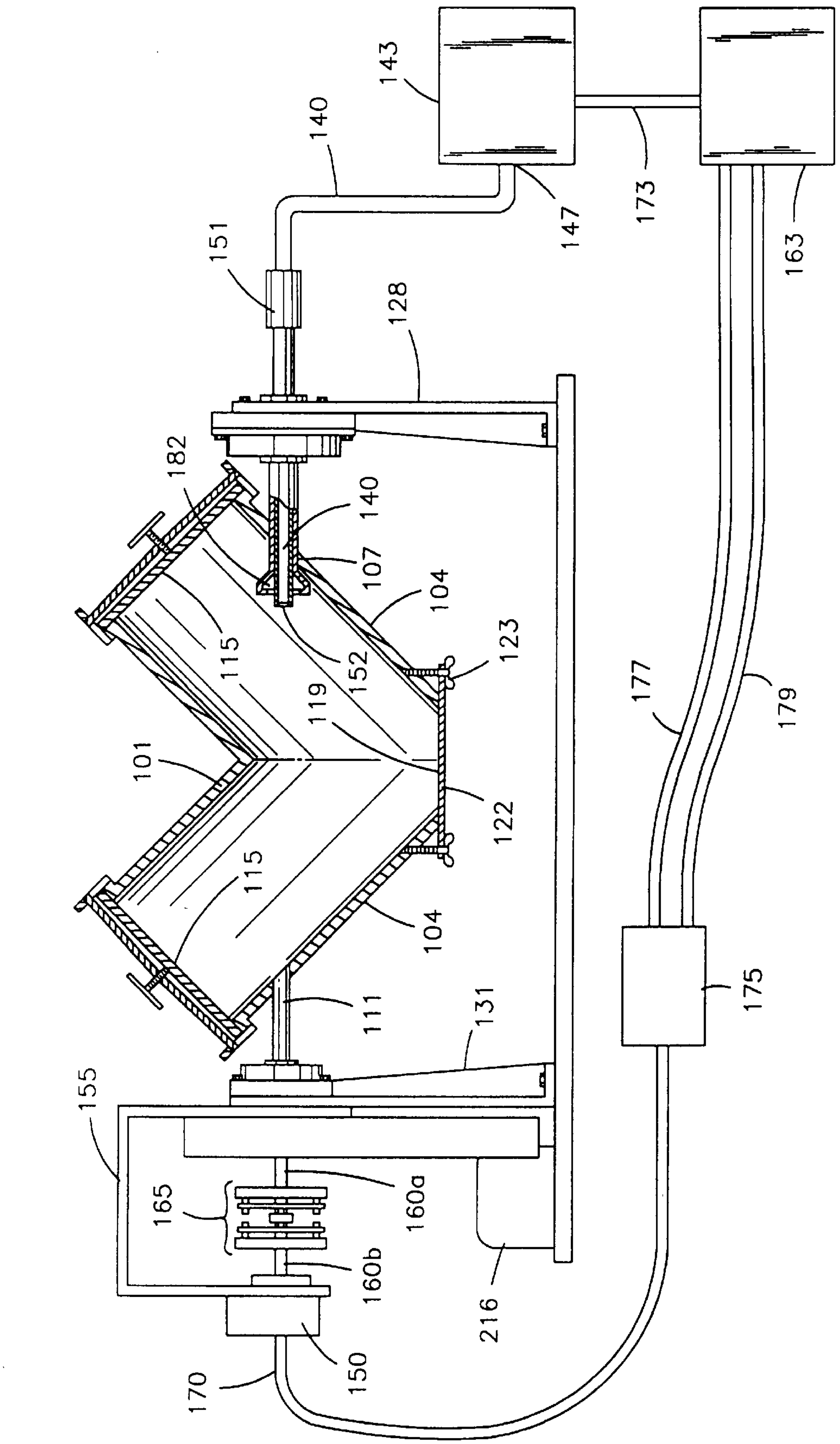
FIG. 8 illustrates another embodiment of the apparatus of this invention having a means for detecting rotational position of the container.

In another preferred embodiment of this invention, according to FIG. 8, a means for detecting rotational (angular) position 150 of container 101 is incorporated into the mixing means. Some examples of means for detecting rotational position are an absolute digital shaft encoder, a pulse encoder, an optical encoder and an analog encoder, the foregoing list is not exhaustive and is not intended to exclude any other possible means for detecting rotational position. A brace 155 has a general "U" shape and has a first leg and a second leg, the first leg of brace 155 is attached to means for detecting rotational position 150. The second leg of brace 155 is attached to second support 131. Further, FIG. 8 shows a first connecting shaft 160*a* and a second connecting shaft 160*b*. The first connecting shaft 160*a* has a first end and a second end. The second connecting shaft 160*b* has a first end and a second end. The first end of first connecting shaft 160*a* is attached horizontally and in-line to second axle 111 so that it turns with the rotation of second axle 111. The second end of first connecting shaft 160*a* is flexibly and fixedly connected to coupling 165. The first end of second connecting shaft 160*b* is flexibly and fixedly connected to coupling 165 so that the second end of first connecting shaft 160*a* and the first end of second connecting shaft 160*b* are facing end to end but do not touch each other. The second end of second connecting shaft 160*b* is attached to the means for detecting rotational position 150. Coupling 165 transmits the rotational force from first connecting shaft 160*a* to second connecting shaft 160*b* so that both first connecting shaft 160*a* and second connecting shaft 160*b* turn simultaneously with the rotation of second axle 111. Further, coupling 165 flexibly and fixedly holds first connecting shaft 160*a* and second connecting shaft 160*b* in order to reduce the rotational stress, during the rotation of second axle 111, between first connecting shaft 160*a* and second connecting shaft 160*b*. The means for detecting rotational position 150 is interfaced by a first set of communication wires 170 to a relay box 175, where said relay box 175 is interfaced with data acquisition and control computer 163 by a second set of communication wires 177. The second set of communication wires 177 relays information from the relay box 175 to data acquisition and control computer 163. In an embodiment wherein the means for detecting rotational position 150 is an absolute digital encoder, the relay box interprets the digital signal from the absolute digital encoder to an ASCII number, the ASCII number represents the rotational position of container 101 in degrees. The ASCII number is transmitted to data acquisition and control computer 163 by the second set of communication wires 177. Data acquisition and control computer 163 is interfaced to spectroscopic means 143 by a third set of communication wires 173. As container 101 rotates, the rotation of second connecting shaft 160*b* is detected by the means for detecting rotational position 150, which relays the rotational position of container 101 to the relay box 175 through the first set of communication wires 170. The relay box 175 then relays the information to data acquisition and control computer 163 through the second set of communication wires 177. Data acquisition and control computer 163, using a control software such as Labview® (commercially available from National Instruments, Austin, Tex. 78730), synchronizes the collection of spectroscopic data by spectroscopic means 143 with a predetermined position of the means for detecting rotational position 150 which translates to a rotational position of container 101, so that spectroscopic data is consistently collected at the predetermined rotational position of container 101. One or more predetermined rotational position points of container 101 may be selected to collect spectral data. The collection of spectroscopic data by spectroscopic means 143 is executed by software programs such as Microsoft Windows® 3.1 (commercially available at most computer supply stores) and WINSAS® (commercially available from NIRSystems Inc. Silver Springs, Md.). The WINSAS® program is instructed as to when to start collecting the spectroscopic data by a control software program such as Labview® via Dynamic Data Exchange (DDE is a feature that is innate to Microsoft Windows® 3.1). Further, data acquisition and control computer 163 is interfaced by a fourth set of communication wires 179 to said relay box 175. Means for rotation 216 may be controlled manually or means for rotation 216 may be controlled by said relay box 175. The interface of data acquisition and control computer 163 to the relay box 175, allows the data acquisition and control computer 163 to turn on or off means for rotation 216 when the data acquisition and control computer determines, by the mathematical analysis described below, that the compositions of matter being mixed has reached the homogeneous end-point. The homogeneous endpoint is determined by transferring the spectroscopic data collected by WINSAS® to another software program such as InStep® (commercially available from Infometrix Inc., Seattle, Wash.) via DDE, the spectroscopic data is then analyzed using pre-calculated models which were developed using a software program such as Pirouettes (commercially available from Infometrix Inc., Seattle, Wash.). Means for rotation 216 may be stopped at desired time intervals before the compositions of matter being mixed reaches a homogeneous end-point so that samples may be taken from container 101 for analysis, or means for rotation 216 may be stopped for any other reasons contemplated by a user. The aforesaid sets of communication wires are any device capable of transmitting optical or electrical signals.

The data acquisition and control computer used in the present embodiment is the Toshiba T6400DX, 33 MHz, 486DX with 16 Mb of RAM, however, the data acquisition and control computer can be any computer with similar or more advanced capabilities.

The initial spectra of the mixture will be closest to the spectrum of each of the individual components of the mixture. As the mixing apparatus begins to mix the compositions of matter, the spectra of the mixture will appear less like the spectra of the individual components and more akin to the spectra of a homogeneous mixture. Eventually the spectra will converge to that of a homogeneous mixture. Utilizing this analytical method the distribution of each of the components in the mixture, the active component as well as the inactive components, can be measured. Thus, enabling the apparatus of this invention to determine the total overall homogeneity of the mixture.

Calculations are performed to estimate when all components of the mixture are homogeneous by measuring the change in a group of spectra as a function of time. For example, a group of 50 spectra are taken at one minute intervals. The standard deviation of the wavelengths of spectra 1–5, followed by 2–6, and 3–7 . . . etc. are calculated. The resulting standard deviation spectra shows which regions of the spectra were changing the most. Calculating the variance in each of the individual deviation spectra would then give a measure of the total variance of the mixture as a function of time. When the total variance has diminished to a constant, the blend is considered homogeneous. Alternatively, a computer can be programmed with a spectrum of a known homogeneous mixture. The mixing is complete when the spectrum of an in-progress mixture matches the spectrum of the known homogeneous mixture.

The embodiments of this invention, which are illustrated in FIGS. 1 to 4 and FIGS. 5, 6*a* to 6*d*, 7 and 8, allow spectra of a mixture of compositions of matter to be collected while the blender is in motion. Therefore, the apparatus of this invention avoids the down-time that is the principal drawback of the traditional process. The apparatus of this invention allows the detection on-line of the homogeneity and potency of the mixture, a feature which is not available in the traditional apparatuses.

The apparatus of this invention can be further modified to accommodate more than one detection means wherein said detection means is a spectroscopic means optionally fitted with a conduction means as described hereinabove. The apparatus of this invention with multiple spectroscopic means can be connected with the same type of spectroscopic means or with different types of spectroscopic means. The exemplary apparatus of this invention, a modified "V"-blender, can be further modified to accommodate two spectroscopic means by using a hollow second axle. A conduction means can be disposed within said hollow second axle in the same manner as described for said fiber optic bundle in said bore of said first axle, described hereinabove.

A conventional blender of the type 500 can be further modified to accommodate multiple spectroscopic means by making as many apertures as required in any desired locations in the blender's walls. Each of the multiple apertures could then be fitted with a conduction means which would be connected to a spectroscopic means as illustrated in FIGS. 6*a*, 6*b* and 6*d* and described hereinabove; or each aperture could be abutted by a spectroscopic means as illustrated in FIG. 6*c* and described hereinabove; or a combination of the embodiments illustrated in FIGS. 6*a* to 6*d*.

An advantage of using more than one detection means of the same type with an apparatus of this invention is that it would allow for acquisition of spectral characteristics of the mixture from two or more locations of the apparatus of this invention. This embodiment of the invention would further insure that the mixture was homogeneous throughout the container.

An advantage of using different types of detection means with an apparatus of this invention is illustrated in the following circumstance. In a pharmaceutical composition there are various components as described hereinabove. Some of the components may only be detectable by one type of radiation, such as near-infrared radiation. The other components of said pharmaceutical composition may only be detectable by another type of radiation other than infrared, for example visible radiation. In such a situation it would be advantageous to have two spectroscopic means connected to the mixing means. The first spectroscopic means, a near-infrared spectrophotometer, and the second spectroscopic means, a visible spectrophotometer. Each spectrophotometer would then detect the spectroscopic characteristics of the components of the pharmaceutical composition which it can detect.

The apparatus of this invention can also be fitted with an alarm which would signal the operator of the apparatus of this invention when the mixture had reached the homogeneity and potency end point. Alternatively, the system could be automatically triggered to shut off when the mixture reaches the homogeneity and potency end point.

It should be understood that the invention is not limited to the particular embodiments shown and described herein, but that various changes and modifications may be made without departing from the spirit and scope of this novel concept as defined by the following claims.

What is claimed is:

1. An apparatus for mixing compositions of matter into a homogeneous mixture and detecting on-line the homogeneity of said mixture, which comprises:

(a) mixing means for mixing said compositions of matter, said mixing means having a container, said container having an aperture, (i) an arbor sealing said aperture of said container and said arbor being an axis of rotation, (ii) means for rotation about said arbor of said container, said means for rotation connected to said container, (iii) said arbor having a tunnel therethrough, (iv) said mixing means having a first support and a second support, said first support having a lateral hole therethrough and said second support having a lateral hole therethrough, (v) said container formed from a first hollow leg open to a second hollow leg, said first hollow leg and second hollow leg converging at an angle giving said container a "V" shape, each of said first hollow leg and said second hollow leg having an outward facing surface wall, (vi) said container having an aperture disposed through the outward facing surface wall of said first hollow leg, (vii) a first ballbearing pillow block having a lateral hole therethrough, said first ballbearing pillow block disposed between said container and said first support and attached to said first support, wherein the hole of said first ballbearing pillow block is aligned with the hole of said first support, (viii) a second ballbearing pillow block having a lateral hole therethrough, said second ballbearing pillow block disposed between said container and said second support and attached to said second support, wherein the hole of said second ballbearing pillow block is aligned with the hole of said second support, (ix) said arbor having a first end and a second end, (x) a second axle having a first end and a second end, the first end of said second axle attached to said outward facing surface wall of the second hollow leg of said container, the second end of said second axle rotatably mounted through said aligned holes of said second support and said second ballbearing pillow block and the second end of said second axle connected to said means for rotation, (xi) the first end of said arbor engaged to said container through said aperture, the first end of said arbor protruding inside the first hollow leg of said container, the second end of said arbor rotatably mounted through said aligned holes of said first support and said first ballbearing pillow block in alignment with said second axle, (xii) a hollow pipe having a first end and a second open end, said first end sealed by an optically transparent sealing means selected from the group consisting of a lens and a transflectance probe, (xiii) said hollow pipe removably disposed within the tunnel of said arbor, the first end of said hollow pipe extending beyond the first end of said arbor, (xiv) a seal occlusively disposed between said hollow pipe and said arbor, (xv) a brace having a first leg and a second leg, said first leg of said brace attached to said second support and said second leg of said brace attached to a means for detecting rotational position, (xvi) a first connecting shaft having a first end and a second end, said first end attached horizontally and in-line to said second axle, said second end fixedly and flexibly connected to a coupling, and (xvii) a second connecting shaft having a first end and a second end, said first end of said second connecting shaft fixedly and flexibly connected to said coupling facing said second end of said first connecting shaft, said second end of said second connecting shaft attached to means for detecting rotational position; and (b) detection means for detecting on-line the homogeneity of said mixture wherein said detection means comprises:

(i) spectroscopic means for measuring the spectroscopic characteristics of said compositions of matter having an opening from which the radiation emanates and is received, and (ii) conduction means for conducting radiation to said mixture from said spectroscopic means and then conducting reflected or transflected radiation to said spectroscopic means, said conduction means having a first end and a second end, said conduction means removably disposed within said hollow pipe with said first end of said conduction means abutting said optically transparent sealing means and the second end of said conduction means attached to the opening of said spectroscopic means.

2. The apparatus according to claim 1 wherein (a) said means for detecting rotational position interfaced to a relay box by a first set of communication wires;

(b) said relay box interfaced to a data acquisition and control computer by a second set of communication wires; and (c) said data acquisition and control computer interfaced to said spectroscopic means by a third set of communication wires.

3. The apparatus according to claim 2 wherein (a) said container has a plurality of openings for loading compositions of matter which are to be mixed and discharging the homogeneous mixture;

(b) said conduction means is a fiber optic bundle;

(c) said means for rotation is an electric motor; and (d) said seal is made of polytetrafluorethane.

4. The apparatus according to claim 3 wherein (a) said data acquisition and control computer interfaced by a fourth set of communication wires to said relay box; and (b) said means for rotation is controlled by said relay box.

5. An apparatus for mixing compositions of matter into a homogeneous mixture and detecting on-line the homogeneity of said mixture, which comprises:

(a) mixing means for mixing said compositions of matter, (i) said mixing means being a V-blender, (ii) said V-blender having an aperture, (iii) an arbor sealing said aperture of said V-blender, said arbor being an axis of rotation, said arbor having a tunnel therethrough, and (iv) means for rotation about said arbor of said V-blender, said means for rotation connected to said V-blender; and (b) detection means for detecting on-line the homogeneity of said mixture wherein said detection means comprises:

(i) spectroscopic means for measuring the spectroscopic characteristics of said compositions of matter having an opening from which the radiation emanates and is received, (ii) conduction means for conducting radiation to said mixture from said spectroscopic means and then conducting reflected or transflected radiation to said spectroscopic means, said conduction means connected to said opening of said spectroscopic means, and (iii) said conduction means removably inserted in said tunnel.

6. The apparatus according to claim 1 wherein said detection means is a near infrared spectrophotometer, an ultraviolet spectrophotometer, a visible spectrophotometer, a Raman spectrophotometer, or a mid-range infrared spectrophotometer.

7. A method for mixing compositions of matter into a homogeneous mixture and detecting on-line the homogeneity of said mixture comprising:

(a) placing the compositions of matter to be mixed into a container of a mixing apparatus having an aperture;

(b) mixing the compositions of matter;

(c) detecting on-line the spectroscopic characteristic of the mixture during the mixing process with a detection means for detecting on-line the homogeneity and potency of said mixture until the spectroscopic characteristic of said homogeneous mixture reaches a predetermined end point for homogeneity or until the spectroscopic characteristic converge, wherein said detecting on-line the spectroscopic characteristic of the mixture during the mixing process with said detection means is synchronized with the detecting of the rotational position of said container by a means for detecting rotational position.

8. A method for mixing compositions of matter into a homogeneous mixture and detecting on-line the homogeneity of said mixture comprising:

(a) placing the compositions of matter to be mixed into a container of a mixing apparatus having an aperture;

(b) mixing the compositions of matter;

(c) detecting on-line the spectroscopic characteristic of the mixture during the mixing process with a detection means for detecting on-line the homogeneity and potency of said mixture until the spectroscopic characteristic of said homogeneous mixture reaches a predetermined end point for homogeneity or until the spectroscopic characteristic converge, wherein said detection means comprises a spectroscopic means having an opening from which radiation emanates and reflected or transflected radiation from said mixture is admitted and the opening of said detection means abuts the aperture of said container.

9. An apparatus for mixing compositions of matter into a homogeneous mixture and detecting on-line the homogeneity of said mixture, which comprises:

(a) a mixing means for mixing compositions of matter wherein said mixing means being a core blender or a ribbon blender, said mixing means having a container, said container having one or more apertures;

(b) pellucid barrier for sealing said aperture; and (c) detection means for detecting on-line the homogeneity of said mixture wherein said detection means comprises a spectroscopic means for measuring the spectroscopic characteristics of said compositions of matter having an opening from which radiation emanates and is received; and conduction means for conducting radiation to said mixture from said spectroscopic means and then conducting reflected or transflected radiation to said spectroscopic means, said conduction means connected to said opening of said spectroscopic means.

10. An apparatus for mixing compositions of matter into a homogeneous mixture and detecting on-line the homogeneity of said mixture, which comprises:

(a) a mixing means for mixing compositions of matter wherein said mixing means being a core blender or a ribbon blender, said mixing means having a container, said container having one or more apertures;

(b) pellucid barrier for sealing said aperture; and (c) detection means for detecting on-line the homogeneity of said mixture wherein said detection means comprises a spectroscopic means for measuring the spectroscopic characteristics of said compositions of matter having an opening from which radiation emanates and is received and the opening of said spectroscopic means abutting said pellucid barrier.

11. An apparatus for mixing compositions of matter into a homogeneous mixture, which comprises:

(a) a mixing means having a container, said mixing means having a means for detecting rotational position, said mixing means having a first support and a second support, said first support having a lateral hole therethrough and said second support having a lateral hole therethrough;

(b) said container formed from a first hollow leg open to a second hollow leg, said first hollow leg and second hollow leg converging at an angle giving said container a "V" shape, each of said first hollow leg and said second hollow leg having an outward facing surface wall;

(c) said container having an aperture disposed through the outward facing surface wall of said first hollow leg;

(d) a first ballbearing pillow block having a lateral hole therethrough, said first ballbearing pillow block disposed between said container and said first support and attached to said first support, wherein the hole of said first ballbearing pillow block is aligned with the hole of said first support;

(e) a second ballbearing pillow block having a lateral hole therethrough, said second ballbearing pillow block disposed between said container and said second support and attached to said second support, wherein the hole of said second ballbearing pillow block is aligned with the hole of said second support;

(f) an arbor sealing said aperture of said container, said arbor being an axis of rotation, said arbor having a first end and a second end and said arbor having a tunnel therethrough;

(g) means for rotating said container about said arbor, said means for rotating said container connected to said container;

(h) a second axle having a first end and a second end, the first end of said second axle attached to said outward facing surface wall of the second hollow leg of said container, the second end of said second axle rotatably mounted through said aligned holes of said second support and said second ballbearing pillow block and the second end of said second axle connected to said means for rotation;

(i) the first end of said arbor engaged to said container through said aperture, the first end of said arbor protruding inside the first hollow leg of said container, the second end of said arbor rotatably mounted through said aligned holes of said first support and said first ballbearing pillow block in alignment with said second axle;

(j) a brace having a first leg and a second leg, said first leg of said brace attached to said second support and said second leg of said brace attached to said means for detecting rotational position;

(k) a first connecting shaft having a first end and a second end, said first end of said first connecting shaft attached horizontally and in-line to said second axle, said second end of said first connecting shaft fixedly and flexibly connected to a coupling; and (l) a second connecting shaft having a first end and a second end, said first end of said second connecting shaft fixedly and flexibly connected to said coupling facing said second end of said first connecting shaft, said second end of said second connecting shaft attached to said means for detecting rotational position.

12. An apparatus according to claim 11 further comprising:

(a) a hollow pipe having a first end and a second open end, said first end sealed by an optically transparent sealing means selected from the group consisting of a lens and a transflectance probe;

(b) said hollow pipe removably disposed within the tunnel of said arbor, the first end of said hollow pipe extending beyond the first end of said arbor; and (c) a seal occlusively disposed between said hollow pipe and said arbor.

13. An apparatus for mixing compositions of matter into a homogeneous mixture and detecting on-line the homogeneity of said mixture, which comprises:

(a) mixing means for mixing said compositions of matter, said mixing means having a container, said container having an aperture;

(b) detection means for detecting on-line the homogeneity of said mixture;

(c) a pellucid sealing means for sealing said aperture disposed between said aperture and said detection means;

(d) spectroscopic means for measuring the spectroscopic characteristics of said compositions of matter having an opening from which radiation emanates and is received; and (e) conduction means for conducting radiation to said mixture from said spectroscopic means and then conducting reflected or transflected radiation to said spectroscopic means, said conduction means connected to said opening of said spectroscopic means.

14. The apparatus according to claim 13 wherein:

(a) said container has an axis of rotation;

(b) means for rotation about said axis of said container, said means for rotation connected to said container;

(c) said axis of rotation having a bore; and (d) said conduction means inserted in said bore.

15. The apparatus according to claim 14, wherein:

(a) said mixing means has a first support and a second support, said first support has a lateral hole therethrough and said second support has a lateral hole therethrough;

(b) said container formed from a first hollow leg open to a second hollow leg, said first hollow leg and second hollow leg converging at an angle giving said container a "V" shape, each of said first hollow leg and said second hollow leg has an outward facing surface wall;

(c) said container has an aperture disposed through the outward facing surface wall of said first hollow leg;

(d) a first ballbearing pillow block having a lateral hole therethrough, said first ballbearing pillow block disposed between said container and said first support and attached to said first support, wherein said first ballbearing pillow block's hole is aligned with said first support's hole;

(e) a second ballbearing pillow block having a lateral hole therethrough, said second ballbearing pillow block disposed between said container and said second support and attached to said second support, wherein said second ballbearing pillow block's hole is aligned with said second support's hole;

(f) a first axle having a first end and a second end and having a bore therethrough;

(g) said pellucid sealing means is selected from the group consisting of a pellucid window and a transflectance probe, said pellucid sealing means covers and seals said bore of first axle at said first end;

(h) a second axle having a first end and a second end;

(i) said second axle's first end attached to said outward facing surface wall of said container's second hollow leg;

(j) said second axle's second end rotatably mounted through said aligned holes of said second support and said second ballbearing pillow block and said second axle's second end connected to said means for rotation;

(k) said first axle's first end engaged to said container through said aperture, said pellucid sealing means protruding inside said container's first hollow leg;

(l) said first axle's second end rotatably mounted through said aligned holes of said first support and said first ballbearing pillow block in alignment with said second axle;

(m) said conduction means having a first end and a second end; and (n) said conduction means removably disposed within said first axle's bore, said conduction means' first end abutting said pellucid window and said conduction means' second end attached to said spectroscopic means' opening.

16. The apparatus according to claim 15 wherein:

(a) said container has a plurality of openings for loading compositions of matter which are to be mixed and discharging the homogeneous mixture;

(b) said conduction means is a fiber optic bundle; and (c) said means for rotation is an electric motor.

17. The apparatus according to claim 14 wherein said mixing means is a V-blender.

18. The apparatus according to claim 17 wherein said detection means is a near infrared spectrophotometer, an ultraviolet spectrophotometer, a visible spectrophotometer, a Raman spectrophotometer, or a mid-range infrared spectrophotometer.

* * * * *

Disclaimer

5,946,088—Paul K. Aldridge, Groton, Conn. APPARATUS FOR MIXING AND DETECTING ON-LINE HOMOGENEITY. Patent dated August 31, 1999. Disclaimer filed April 9, 2003 by assignee, Pfizer Inc.

Hereby enters this disclaimer to claims 1-18 of said patent.

*(Official Gazette, July 15, 2003)*